Patented Feb. 18, 1941

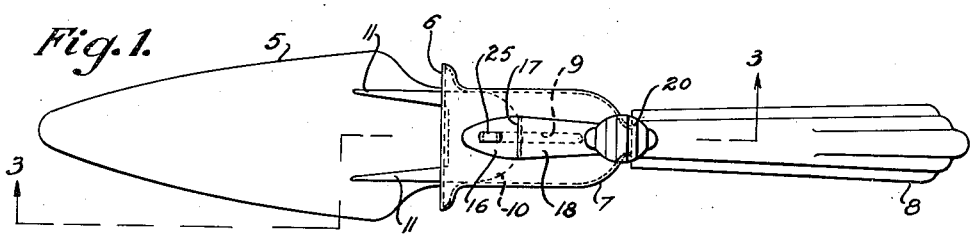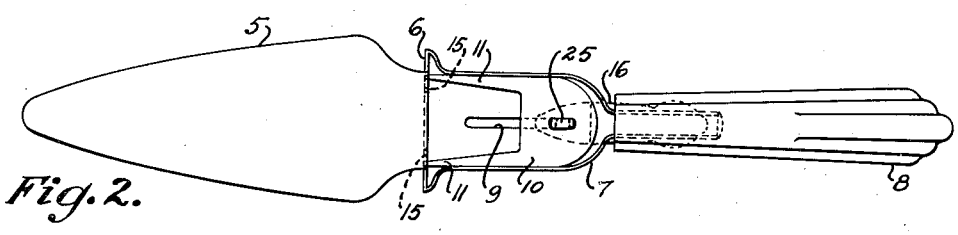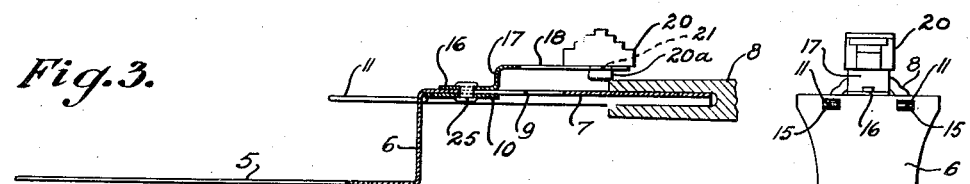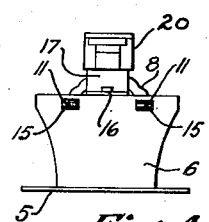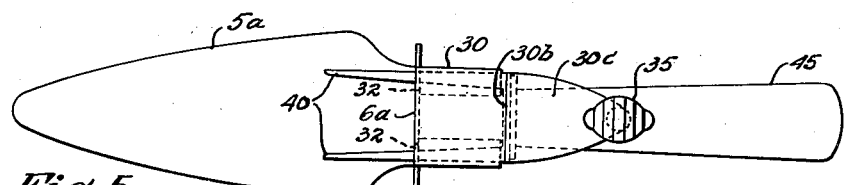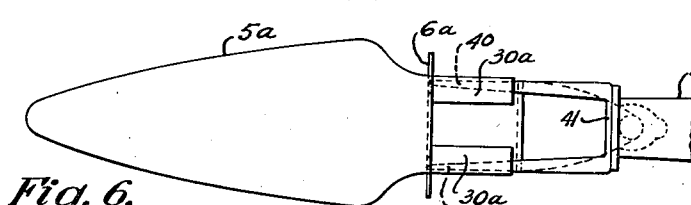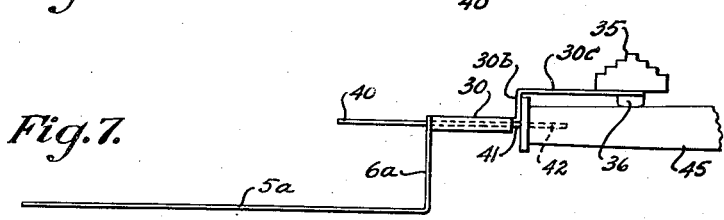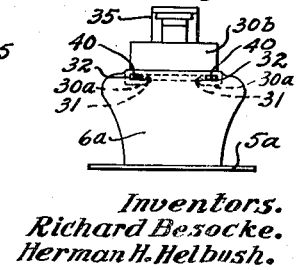

2,232,204

UNITED STATES PATENT OFFICE 2,232,204

SERVING UTENSIL

Richard Besocke, Arcadia, and Herman H. Helbush, Los Angeles, Calif.; said Besocke assignor to said Helbush Application June 30, 1939, Serial No. 282,122

5 Claims. (Cl. 294—1)

Our invention has to do with household utensils and, more particularly, it relates to improvements in devices for serving cake, pie and the like.

The conventional devices for lifting a slice of cake, for instance, after it is cut from the whole cake, is what may be described as a two-edged knife with no means associated therewith for retaining the item on the utensil while it is being removed from the whole cake and served onto a plate or the like.

It is an object of our invention to provide, in combination with such a utensil, and as a unitary part thereof, means for positively retaining the slice being carried on the utensil.

Another object is to provide, in such a combination, means whereby the slice retaining member may be easily disengaged from the slice without moving the supporting blade.

Another object is the provision of a utensil of the class described which is economical of manufacture, sanitary and easy to clean.

Those and still further objects and attainments will become obvious from the following detailed description of one presently preferred adaptation of our invention, for which purpose we refer to the accompanying drawing, in which:

Fig. 1 is a top plan view;

Fig. 2 is a bottom view;

Fig. 3 is a section on line 3—3 of Fig. 1;

Fig. 4 is an end view taken from the left end of Fig. 1;

Fig. 5 is a top plan view of a variational form of device;

Fig. 6 is a bottom view of the device of Fig. 5, with a portion of the handle broken away, and showing the prongs in retracted position;

Fig. 7 is a side view of the device of Fig. 5; and

Fig. 8 is an end view taken from the left end of Fig. 5.

In general, we carry our invention into practice by providing a blade-like member mounted at its shank end in a suitable handle, and at the base of the blade we provide a pronged member slidably mounted with respect to the base so that when the blade is supporting a slice of cake or the like the pronged member may be inserted therein to retain the slice in position on the blade until it is desired to be removed therefrom, at which time the prong is withdrawn from the slice to allow it to slip off the blade.

Referring now to the drawing, we show a spear-shaped blade 5 which has a base portion 6 extending perpendicular to the plane of the blade, and a shank 7 extending at right angles from the top of the blade base 6, said shank being mounted at its outer end in a suitable handle 8. That portion of the shank between the handle and base is provided with a longitudinally extending slot 9.

Slidably mounted against the underface of shank 7, we provide a pronged plate 10 having a plurality of prongs 11 (here shown as two in number) at its forward end, said prongs extending through and being slidable in holes 15 provided through base 6. Slidably mounted against the top face of shank 7 there is a top plate 16 which has a rearward portion extending upwardly at 17 and rearwardly at 18, an operating knob 20 being mounted on portion 18 by means of having its portion 20a of reduced diameter (Fig. 3) fit into a hole 21 through plate portion 18. Top plate 16 is secured to the pronged plate 10 by means of a rivet 25, which rivet extends through slot 9 so that the unit consisting of the blade, base and shank and the unit consisting of the pronged member 10, the rivet 25 and the top plate 16, are slidable with respect to each other. Those portions of shank 7 which form the ends of slot 9, provide stops defining the extremes of movement of rivet 25 along the slot 9—in other words, slot 9 is of such length and is so positioned with respect to the base 6 that in one extreme of relative movement between the base and the pronged plate the prongs 11 are inserted up to their base portions through the holes 15 so that they overhang the blade 5, and at the other extreme of said relative movement the prongs are substantially, but preferably not entirely, withdrawn from said holes.

In operation, the prongs 11 are retracted to the right from the position shown in Fig. 1 to that shown in Fig. 2, by using the thumb to move knob 20 to the right. Then the blade 5 is inserted under the slice of material being served until an end of the slice abuts base 6, at which time the knob 20 is moved to the left by thumb operation, which acts to insert the prongs 11 into the end of the slice so that it is positively retained in position on the blade until it is desired to remove it, at which time the prongs are withdrawn as before described and the blade is withdrawn from beneath the slice.

In Figs. 5 to 8, inclusive, we show a variational form of device comprising a blade 5a having a base 6a. The base has a backwardly projecting portion 30 which is provided with bottom inwardly extending flanges 30a which provide passageways 31 communicating with openings 32 through the base. Portion 30 has an up-turned portion 30b and a shank portion 30c upon which an operating knob 35 is mounted by inserting its reduced diameter portion 36 through an opening in the shank. A pronged member having two prongs 40, a base 41 and a shank 42, is slidably mounted with respect to the blade unit by means of the prongs being slidably mounted in passageways 31 and projecting through the holes 32. Shank 42 is mounted in a handle 45.

The operation of the device of Figs. 5 to 8, inclusive, is as follows. In reparing the device for use, the parts are moved from the position of Fig. 5 to that of Fig. 6 by gripping the handle 45 and using the thumb to move knob 35 to the left, which causes the blade to move to the left with respect to the stationarily held handle and its carried prongs 40. When the material, such as a slice of cake, is deposited on the blade, the parts are moved in the reverse direction which causes the prongs to penetrate the material and hold it in position on the blade until released.

We wish it understood that the foregoing description is intended as illustrative rather than restrictive, inasmuch as our invention may be embodied in other specific forms without departing from its spirit or essential characteristics as defined by the appended claims.

We claim:

1. A serving utensil of the class described comprising a blade having a base portion extending upwardly from the blade and a shank extending rearwardly from and at substantially right angle to the base portion, a longitudinal slot in the shank, a hole through the base at a point spaced above the blade, a pronged plate disposed against the underface of the shank, said plate having a prong extending through said hole, a pin secured to the plate, said pin extending upwardly through and being slidable along said slot, and manual operating means on the top end of said pin.

2. A utensil for serving slices of cake and the like comprising a slice supporting blade, a base extending upwardly from the blade, a hole through the base and a piercing element supported from the base to slidably project through said hole, said piercing element being slidable with respect to the blade in a plane above and parallel to the blade and said base being positioned to be abutted by the end of the slice supported on the blade whereby to prevent longitudinal movement of the slice on the blade during sliding of the piercing element through said hole in the direction of the base.

3. A serving utensil of the class described comprising a blade having a base portion extending perpendicular to the plane of the blade and a shank portion extending rearwardly from and at right angles to the base portion, a longitudinal slot in the shank portion, a hole through the base at a point spaced above the blade, a pronged plate disposed against the underface of the shank portion, said plate having a prong extending through said hole, a top plate disposed against the top surface of the shank, an operating knob secured to said top plate, and a pin operably securing the pronged plate to the top plate, said pin extending through and being slidable along the slot.

4. A cake serving utensil of the character described having, in combination with a blade presenting a shank portion and an intermediate base portion disposed at right angles to the blade and shank, a plurality of holes through the base at a point spaced above the plane of the blade, a slot extending longitudinally of the shank portion, a pronged plate slidably mounted under the shanked portion and having its prongs slidably mounted in said holes, a top plate slidably mounted over the shank, a rivet extending through and slidable along the slot and operably connecting the top plate to the pronged plate, and an operating knob secured to the top plate, said slot being of a length permitting movement of the prongs through said holes to their full length but being short enough to prevent said prongs from being completely withdrawn from the holes.

5. A cake serving utensil of the class described having a plate presenting a base portion disposed at an angle to the blade, slotted members carried by and projecting from and at an angle to the base, and a pronged element slidably mounted in the slotted members whereby the prongs are movable to and from positions overhanging the blade.

RICHARD BESOCKE.
HERMAN H. HELBUSH.